United States Patent
Chanclon Fernandez et al.

(10) Patent No.: US 11,123,929 B2
(45) Date of Patent: Sep. 21, 2021

(54) DATA UNITS FOR BUILD MATERIAL IDENTIFICATION IN ADDITIVE MANUFACTURING

(71) Applicants: HEWLETT-PACKARD DEVELOPMENT COMPANY, L.P., Houston, TX (US); Ismael Chanclon Fernandez, Sant Cugat del Valles (ES); Xavier Alonso Becerro, Sant Cugat del Valles (ES); Ernesto Alejandro Jones Poppescou, Vacarisses (ES); Jorge Castano Aspas, Sant Cugat del Valles (ES); Salvador Sanchez Ribes, Sabadell (ES); Luis Garcia Garcia, Les Roquetes (ES); Carmen Blasco, Barcelona (ES)

(72) Inventors: Ismael Chanclon Fernandez, Sant Cugat del Valles (ES); Xavier Alonso Becerro, Sant Cugat del Valles (ES); Ernesto Alejandro Jones Poppescou, Vacarisses (ES); Jorge Castano Aspas, Sant Cugat del Valles (ES); Salvador Sanchez Ribes, Sabadell (ES); Luis Garcia Garcia, Les Roquetes (ES); Carmen Blasco, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 195 days.

(21) Appl. No.: 16/068,588

(22) PCT Filed: May 12, 2016

(86) PCT No.: PCT/EP2016/060719
§ 371 (c)(1),
(2) Date: Jul. 6, 2018

(87) PCT Pub. No.: WO2017/194132
PCT Pub. Date: Nov. 16, 2017

(65) Prior Publication Data
US 2019/0061261 A1 Feb. 28, 2019

(51) Int. Cl.
*B33Y 30/00* (2015.01)
*B29C 64/386* (2017.01)
(Continued)

(52) U.S. Cl.
CPC ............ *B29C 64/386* (2017.08); *B29C 64/20* (2017.08); *B29C 64/255* (2017.08); *B33Y 30/00* (2014.12); *B33Y 40/00* (2014.12); *B33Y 50/00* (2014.12)

(58) Field of Classification Search
None
See application file for complete search history.

(56) References Cited

U.S. PATENT DOCUMENTS 2,856,449 A * 10/1958 Coler .................... B65D 85/38
174/50.64
3,770,156 A * 11/1973 Yates, Jr. ........... B65D 43/0256
215/250

(Continued)

FOREIGN PATENT DOCUMENTS

RU 2013159169 7/2015

*Primary Examiner* — Anthony Q Edwards
*Assistant Examiner* — Rashen E Morrison
(74) *Attorney, Agent, or Firm* — HP Inc. Patent Department

(57) ABSTRACT

In an example, a data unit includes a data unit mounting having a circuitry region, a registration portion, and a retaining feature. Circuitry comprising a data source to provide at least one additive manufacturing parameter is arranged on the circuitry region of the mounting. The data unit mounting is to be removably mounted on a receiving portion of an additive manufacturing build material component, such that the registration portion is to be received in a (Continued)

corresponding guide portion of the receiving portion of the additive manufacturing build material component, and the retaining feature is prevent removal of the data unit from the receiving portion unless deformed. Deformation of the retaining feature to effect removal of the data unit from the receiving portion may be a permanent deformation.

21 Claims, 5 Drawing Sheets

(51) Int. Cl.
- *B33Y 40/00* (2020.01)
- *B29C 64/20* (2017.01)
- *B33Y 50/00* (2015.01)
- *B29C 64/255* (2017.01)

(56) References Cited

U.S. PATENT DOCUMENTS

| | | | | |
|---|---|---|---|---|
| 5,232,091 | A * | 8/1993 | Hennessy | H05K 13/0084 206/713 |
| 5,652,410 | A * | 7/1997 | Hobbs | H05K 9/0022 174/366 |
| 5,788,388 | A * | 8/1998 | Cowger | B41J 2/17566 400/703 |
| 6,022,207 | A | 2/2000 | Dahlin et al. | |
| 6,210,193 | B1 | 4/2001 | Ito et al. | |
| 6,793,305 | B2 * | 9/2004 | Tsukada | B41J 2/17513 347/7 |
| 6,827,432 | B2 * | 12/2004 | King | B41J 2/1752 347/86 |
| 7,008,034 | B2 * | 3/2006 | Tsukada | B41J 2/17523 347/19 |
| 7,029,104 | B2 * | 4/2006 | Sakai | B41J 2/175 347/19 |
| 7,354,290 | B2 * | 4/2008 | Zhan | H01R 13/2478 439/326 |
| 7,427,128 | B2 * | 9/2008 | Hayasaki | B41J 2/17509 347/19 |
| 7,686,441 | B2 * | 3/2010 | Hashii | B41J 2/17553 347/86 |
| 7,717,541 | B2 * | 5/2010 | Shimizu | B41J 2/17546 347/49 |
| 7,887,166 | B2 * | 2/2011 | Guhse | B41J 2/17506 347/85 |
| 8,382,250 | B2 * | 2/2013 | Asauchi | B41J 2/17546 347/50 |
| 9,108,418 | B2 * | 8/2015 | Kanbe | B41J 2/17509 |
| 9,233,504 | B2 * | 1/2016 | Douglas | B29C 64/209 |
| 9,555,606 | B1 * | 1/2017 | Fisher | H05K 3/284 |
| 9,862,198 | B2 * | 1/2018 | Tsukahara | B41J 2/17513 |
| 10,137,694 | B2 * | 11/2018 | Tsukahara | B41J 2/1753 |
| 10,334,722 | B2 * | 6/2019 | Brodsky | H05K 7/023 |
| 10,632,679 | B2 * | 4/2020 | Menchik | B33Y 30/00 |
| 2004/0142603 | A1 * | 7/2004 | Walker | H01L 25/18 439/701 |
| 2005/0056441 | A1 * | 3/2005 | Rider | H01L 21/67778 174/387 |
| 2005/0255753 | A1 * | 11/2005 | Buschmann | H05K 5/0221 439/630 |
| 2006/0049941 | A1 * | 3/2006 | Hunter | G08B 13/128 340/545.6 |
| 2006/0127153 | A1 * | 6/2006 | Menchik | B29C 64/40 400/62 |
| 2007/0060198 | A1 | 3/2007 | Kuo | |
| 2007/0096904 | A1 * | 5/2007 | Lockyer | G08B 13/08 340/545.1 |
| 2008/0307881 | A1 * | 12/2008 | Schroth | G01F 23/284 73/304 C |
| 2009/0229359 | A1 * | 9/2009 | Reimelt | G01F 23/284 73/304 R |
| 2009/0229671 | A1 * | 9/2009 | Hartnett | F16K 1/12 137/13 |
| 2010/0177487 | A1 * | 7/2010 | Arshad | G06F 21/86 361/737 |
| 2010/0288552 | A1 * | 11/2010 | Pedoeem | G06F 1/182 174/378 |
| 2012/0098901 | A1 * | 4/2012 | Asauchi | B41J 2/17566 347/86 |
| 2012/0187126 | A1 * | 7/2012 | Shemesh | B65D 41/12 220/266 |
| 2012/0276233 | A1 * | 11/2012 | Napadensky | B29C 64/386 425/145 |
| 2013/0285798 | A1 * | 10/2013 | Koike | G06K 7/10009 340/10.51 |
| 2014/0117585 | A1 * | 5/2014 | Douglas | B29C 48/92 264/401 |
| 2015/0190966 | A1 * | 7/2015 | Griszbacher | B33Y 50/02 264/40.6 |
| 2016/0016362 | A1 | 1/2016 | Kim et al. | |
| 2016/0046415 | A1 * | 2/2016 | Buck | B65D 43/026 220/256.1 |
| 2016/0068793 | A1 * | 3/2016 | Maggiore | B29C 64/227 435/289.1 |
| 2017/0116830 | A1 * | 4/2017 | Isaacs | G08B 13/128 |
| 2017/0135188 | A1 * | 5/2017 | Heidebrecht | G06F 3/041 |
| 2017/0196128 | A1 * | 7/2017 | Elizondo, II | H01L 23/552 |
| 2019/0061250 | A1 * | 2/2019 | Chanclon Fernandez | B33Y 40/00 |
| 2019/0077084 | A1 * | 3/2019 | Granados Asensio | B29C 64/386 |
| 2020/0001172 | A1 * | 1/2020 | Nicoli | G06F 3/016 |
| 2020/0111717 | A1 * | 4/2020 | Gmunder | H01L 23/3121 |

* cited by examiner

DATA UNITS FOR BUILD MATERIAL IDENTIFICATION IN ADDITIVE MANUFACTURING

BACKGROUND

Additive manufacturing techniques such as three-dimensional (3D) printing relate to techniques for making 3D objects of almost any shape from a digital 3D model through additive processes in which 3D objects are generated on a layer-by-layer basis under computer control. A large variety of additive manufacturing technologies have been developed differing in build materials, deposition techniques and processes by which the 3D object is formed from the build material. Such techniques may range from applying ultraviolet light to photopolymer resin, to melting semi-crystalline thermoplastic materials in powder form, to electron-beam melting of metal powders.

Additive manufacturing processes may begin with a digital representation of a 3D object to be manufactured. This digital representation may be virtually sliced into layers by computer software or may be provided in pre-sliced format. Each layer represents a cross-section of the object to be manufactured, and is sent to an additive manufacturing apparatus, (also termed a "3D printer") where it is built upon a previously built layer. This process is repeated until the object is completed, thereby building the object layer-by-layer. While some available technologies directly print material, others use a recoating process to form additional layers that can then be selectively solidified in order to create the new cross-section of the object.

The build material from which the object is manufactured may vary depending on the manufacturing technique and may comprise powder material, paste material, slurry material or liquid material. The build material is usually provided in a source build material container from where it is transferred to the building area or building compartment of the additive manufacturing apparatus where the actual manufacturing takes place.

DRAWINGS

FIGS. 1*a* and 1*b* are schematic drawings of an example data unit;

DESCRIPTION

Figure 1A:
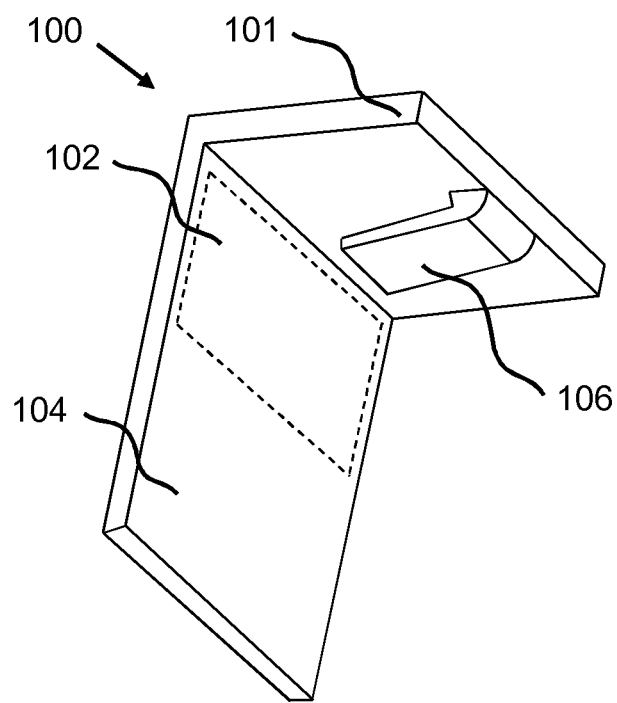

Three-dimensional objects can be generated using additive manufacturing techniques. The objects may be generated by solidifying portions of successive layers of build material. The build material can be powder-based and the properties of generated objects may be dependent on the type of build material and the type of solidification. In some examples, solidification of the powder material is enabled using a liquid fusing agent. In further examples, solidification may be enabled by temporary application of energy to the build material. In certain examples, fusing and/or bind agents are applied to build material, wherein a fusing agent is a material that, when a suitable amount of energy is applied to a combination of build material and fusing agent, causes the build material to fuse and solidify. In other examples, other build materials and other methods of solidification may be used. In certain examples, the build material includes paste material, slurry material or liquid material.

In this disclosure, source containers for adding build material to the additive manufacturing process may be provided. In one example the build material in the source build material container is powder that has an average volume-based cross sectional particle diameter size of between approximately 5 and approximately 400 microns, between approximately 10 and approximately 200 microns, between approximately 15 and approximately 120 microns or between approximately 20 and approximately 80 microns. Other examples of suitable, average volume-based particle diameter ranges include approximately 5 to approximately 80, or approximately 5 to approximately 35 microns. In this disclosure a volume-based particle size is the size of a sphere that has the same volume as the powder particle. With "average" it is intended to imply that most of the volume-based particle sizes in the container are of the mentioned size or size range but that the container may also contain particles of diameters outside of the mentioned range. For example, the particle sizes may be chosen to facilitate distributing build material layers having thicknesses of between approximately 10 and approximately 500 microns, or between approximately 10 and approximately 200 microns, or between approximately 15 and approximately 150 microns. One example of an additive manufacturing system may be pre-set to distribute build material layers of approximately 90 microns using build material containers that contain powder having average volume-based particle diameters of between approximately 40 and approximately 60 microns. For example the additive manufacturing apparatus can be reset to distribute different layer thicknesses.

Suitable powder-based build materials for the container of this disclosure include at least one of polymers, crystalline plastics, semi-crystalline plastics, polyethylene (PE), polylactic acid (PLA), acrylonitrile butadiene styrene (ABS), amorphous plastics, Polyvinyl Alcohol Plastic (PVA), Polyamide, thermo(setting) plastics, resins, transparent powders, colored powders, metal powder, ceramics powder such as for example glass particles, and/or a combination of at least two of these or other materials wherein such combination may include different particles each of different materials or different materials in a single compound particle. Examples of blended build materials include alumide, which may include a blend of aluminium and polyamide, multi-color powder, and plastics/ceramics blends.

In additive manufacturing, it may be the case that build materials become heated. For example, where fusing agents are applied and caused to absorb energy, this tends to heat the build material, in particular in the regions to which fusing agents have been applied. In addition, some additive manufacturing processes may pre-heat build materials, or may comprise exothermic chemical reactions or the like. In such processes, there is a possibility of build material overheating, for example to the point where it could damage apparatus or even ignite.

Different build materials may be associated with different processing temperatures. For example, different materials may have different melting points, or different flash points (the flash point is the temperature at which a build material may evaporate to such an extent that the vapour may ignite). In addition, different temperatures may result in different physical properties of an object, such as object strength, resilience, appearance or the like.

A particular additive manufacturing apparatus may be intended to be used with a range of such materials and therefore may comprise settings (temperature settings, layer processing times, etc.) which are matched to the build material being processed thereby. If too high a temperature is reached during object generation for a particular build material, there are risks, which may include an object failing to be manufactured as intended, damage to equipment, and/or the possibility of explosions and/or fire. In some examples, the additive manufacturing apparatus may be arranged for operation with a particular build material or range thereof, and attempting to manufacture an object using a different build material may result in similar risks.

In addition to considering careful handling of individual build materials, consideration may also be made in relation to mixtures of build material, even at a trace level. For example, a poorly considered mixture may result in failure to manufacture an object as intended, as different melting temperatures may mean that some material within the mixture melts and other does not, or some material may overheat. In other examples, the object may have unintended properties as a result of a poorly considered mixture. Moreover, different build materials may react adversely with one another, for example when heat is applied (for example, when the build material is molten or in a vapour state). Again, there may be risks of damage to apparatus, infrastructure or personnel.

In examples set out herein, a supply of build material may be associated with a data source providing at least one additive manufacturing parameter, which may be or include a build material parameter (e.g. describing an aspect or attribute of the build material), or an authorisation parameter, which may play a part in an 'authorisation to print' operation, for example unlocking an additive manufacturing apparatus for use. In some examples, the association between the data source and the supply may be a physical association, for example a data source such as a solid state memory may be attached to a container in which the build material is transported. However, even if the build material is physically or otherwise associated with a supply of build material, it may that counterfeit or uncontrolled sources of build material are available. Thus, in some examples set out herein, the source of the memory is verifiable such that a user may be confident that the build material is from a trusted source and, where build material parameters are provided, the user may be confident that the build material is as described by the build material parameter(s).

Figure 1B:
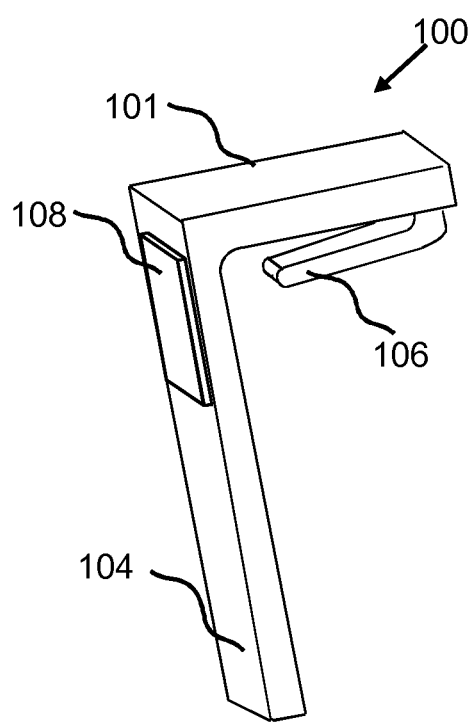

FIGS. 1a and 1b show an example of a data unit 100 comprising a mounting 101, the mounting 101 comprising a circuitry region 102 to receive a circuitry, a registration portion 104 and a retaining feature 106. As can be seen from FIG. 1b, circuitry 108, which comprises a data source, is mounted on the circuitry region 102.

The data unit mounting 101 is to removably mount a data unit 100 on a receiving portion of an additive manufacturing build material component. In an example, the component comprises an additive manufacturing build material container, wherein the registration portion 104 is to be received in a corresponding guide portion of the receiving portion of the additive manufacturing build material container, and the retaining feature 106 is prevent removal of the data unit 100 from the receiving portion unless deformed, wherein the deformation of the retaining feature 106 to effect removal of the data unit from the receiving portion is a permanent deformation. For example, the retaining feature 106 may be permanently deformed by a plastic deformation, which may include snapping or breaking of the retaining feature 106. As described herein after, a data unit 100 may be provided to provide at least one of: authorisation for object manufacture processes, data relating to build materials or object generation, and validation of such data and/or build materials.

Such a mounting 101 allows a data unit 100 to be removably mounted on an additive manufacturing build material component such as a build material container, meaning it may be either read in situ on a build material container, or removed therefrom for reading. For example, when in situ on the build material container, it may be read using a reader which is brought into proximity therewith. In some examples, the reader may be provided in a build material extraction element, such as an aspiration tube as described below. However, as the data unit 100 may be removed from the build material container, it may be communicably coupled with other reader apparatus. For example, the data unit 100 could be placed in a reader slot or drive, or brought into proximity with a proximity reader or the like. This means that the content of the data unit 100 may be accessed in different ways and by different apparatus, which in turn eases the specifications for an end user to have a particular reader apparatus.

To consider an example in which a reader is provided in an extraction element such as an aspiration tube and is intended to communicate with the data unit 100 in situ, this allows for ease of handling of the build material and for transfer of information from the data unit 100. However, it may be the case that additive manufacturing apparatus could be operated in the absence of such an extraction element. In that case, as the data unit 100 is arranged to be removably mounted, it may be removed therefrom and read in an alternative fashion. This increases the options for accessing the data thereon (which, as noted above, may enhance safety by correctly identifying build materials or attributes thereof, or providing authentication of the source of the build material and/or data content). For example, a user could convey a data unit 100 to alternative reader apparatus, such as a card slot on an additive manufacturing apparatus.

It may also be noted that build material containers may be bulky, and the contents thereof may be relatively costly. By providing a separable data unit 100, the whole container need not be moved to access the data in some examples, and a faulty data unit 100 may be replaced with replacing the entire build material container (and in some examples, its content).

In some examples, the data unit mounting 101 may be adapted for tool-less insertion and/or removal from a build material container. This increases the flexibility of the data unit 100 as it may be added to or removed from a build material container without any tools (and thus may for example be easily removed or added by an end user). To that end, the data unit mounting 101 may be deformable by hand, and/or may comprise handling features to allow for ease of manual manipulation thereof.

The retaining feature 106 may be plastically deformable, i.e. deformation thereof is at least partially irreversible. There may be some elastic deformation of the retaining feature 106, but beyond a threshold stress (which may be less than the pressure applied remove a data unit 100 from the build material container), the deformation may be permanent (for example, the retaining feature 106 may snap or break) or otherwise apparent from inspection of the mounting 101. This may reduce the reusability of a data unit 100, and may provide a tamper evident feature. In some examples, deformation of the retaining feature may occur in preference to other portions of the data unit mounting 101. For example, the retaining feature may be relatively weaker (for example, more readily bent or broken) than the circuitry region 102. This may mean that circuitry 108 is mounted on a portion which is unlikely to bend or flex under normal manipulation of the data unit 100, and may therefore be protected from damage which could be caused by such bending.

The data unit mounting 101 may comprise, in whole or in part, a plastic material. As such, the mounting 101 may be relatively low cost. The data unit mounting 101 may be a plastic, monolithic component. In some examples, the data unit mounting 101 may comprise, in whole or in part, a conductive plastic material. In order to prevent a build-up of static energy, conductive components may be used to couple the build material container to other apparatus. Providing a conductive mounting contributes to the electrical coupling. In other examples, non-conductive mountings may be provided. In some examples, the mounting 101 may be conductive, but comprise a different material, such as an electrically insulating plastic bearing metal tracks, or be formed of metal or the like. By providing a separable mounting 101, the conductive properties of a data unit 100 may be designed separately to the conductive properties of any other aspect of the build material container, which may reduce compromise in design. For example, in order to function with particular read apparatus (for example, to mitigate interference or the like), it may be that any circuitry may be electrically isolated by providing an electrically isolating mounting 101. Therefore, in some examples, the mounting 101 may comprise a different material, or have different material properties, to a build material container in which it is mounted.

Figure 2:
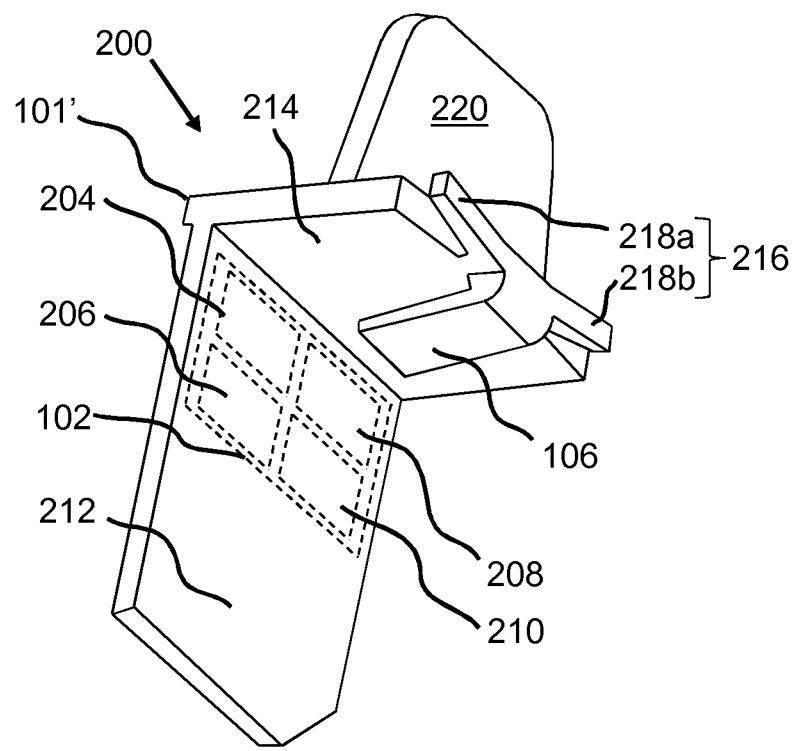
FIG. 2 shows another example data unit.

FIG. 2 shows another example of a data unit 200. The data unit 200 may be a portable and/or standalone data unit, for example being readily transportable by hand. The data unit 200 comprises a data unit mounting 101' and, mounted on the circuitry region 102 thereof, a data source comprising a memory 204 which stores a plurality of additive manufacturing parameters, a communications interface 206, an authentication module 208 to provide an authentication response to an authentication request and a data security module 210 to decrypt data held in the memory 204. In some examples, the data security module 210 may also encrypt data to be written to the memory 204. As can be best seen in FIG. 3, in this example, the circuitry region 102 comprises a portion of the data unit mounting 101' which is recessed within a face thereof. This allows the memory 204 and other circuitry to be at least partially embedded within the width of the mounting 101, providing protection thereof. In this example, the circuitry at least partially protrudes from the face, which may facilitate electrical connection with a reader apparatus as described in greater detail below. In other examples, the circuitry may be arranged in the plane of the face, or recessed therein.

The memory 204 may for example comprise non-volatile memory, such as at least one of read-only memory (ROM, or erasable programmable ROM, EPROM), flash memory, ferroelectric RAM (F-RAM), magnetic memory, optical memory or the like. In some examples, the memory 204 may store data for a prolonged period. In other examples, the memory 204 may be for temporary storage of data, for example following generation thereof in response to a request for data.

The memory 204 may store a plurality of additive manufacturing parameters. The additive manufacturing parameters stored in the memory 204 may comprise authentication data. The authentication data may be for use in authentication of the build material and/or the data stored in the memory. In some examples, the authentication data may allow the data unit 200 to authenticate other apparatus or data sources, for example an additive manufacturing build material processing apparatus with which it is in communication. For example, the memory 204 may be provided with a key, or a password, for use in authentication.

The additive manufacturing parameters stored in the memory 204 may comprise build material identification data. For example, this may comprise an identification of the material, class of material, particle size, range of particle sizes, origin (for example, supplier, country of origin, factory of origin) or the like.

In some examples, the additive manufacturing parameters may comprise build material processing parameters, for example temperatures, speeds or other conditions of processing.

In some examples, the additive manufacturing parameters may comprise compatible build material identification data. Compatible may mean that the build materials can be mixed and an object successfully (and safely) generated therefrom. For example, a particular plastic build material may be compatible with itself and a range of other plastics. However, it could be incompatible with another plastic, or with a different material such as a rubber. Compatible and/or incompatible materials could be explicitly listed. Providing a list in this manner may allow an additive manufacturing processing apparatus to learn the compatibility of new build materials.

In some examples, a mixture may be formed deliberately. For example, an object may be generated from build material comprising a proportion of build material from a plurality of sources, which may include at least one source build material container and/or at least one recycled build material source. In some such examples, the parameters may comprise mixing percentage ranges, for example a maximum or minimum proportion of recycled build material, or build material of a particular type, or the like. However, in other examples, at least one build material may be present in small amounts, for example following trace amounts may remain in an apparatus from a previous processing activity.

In some examples, at least some additive manufacturing parameters may be stored in the memory 2024 as a compressed XML file. For example, such a file may be an indexed file, and the date may be recoverable by a reader with access to a dictionary. In other examples, XML compressors such as XMill, XGRind, Xpress, XComp or the like may be used.

The communications interface 206 is arranged to communicate with a reader of an additive manufacturing build material processing apparatus. For example, this may be an additive manufacturing apparatus or '3D printer' which fabricates an object in a layer wise manner, or may be build material treatment apparatus, such as a build material mixing apparatus, or some other apparatus for use in additive manufacturing. In some examples, the communications interface 206 may comprise a galvanic interface, i.e. an electrical connection is made over which data may be sent or received. In some examples, the communications interface 206 may operate using 'wireless' communication methods, such as radio or optical transmission methods. Data from the memory 204 may be transmitted to the additive manufacturing build material processing apparatus by the communications interface 206.

The authentication module 208 may for example comprise at least one processor and may be arranged to receive an authentication request from an additive manufacturing build material processing apparatus (for example, received via the communications interface 206) and to provide an authentication response for communication to the additive manufacturing build material processing apparatus. This authentication may be based on an additive manufacturing parameter stored in the memory 204, for example a cryptographic secret code or password or the like.

Thus, the authentication module 208 may provide an additive manufacturing build material processing apparatus with validation of the source of the build material and/or additive manufacturing parameters via the communications interface 206. The additive manufacturing build material processing apparatus may then (in some examples, on completion of checking of the validity of the authentication response) trust the content of data source. As the data unit 200 may be associated with a particular source of build material, for example being provided on or in a build material container, once the authentication response is verified, it may be that the associated build material is also considered to be verified and the subsequent processing thereof can be conducted with confidence that both the data and the build material itself are from a trusted source.

For example, the authentication module 208 may be arranged to receive an authentication request comprising a message, to encrypt the message (for example using a key issued thereto at manufacture) and provide an authentication response which includes the encrypted message. The build material processing apparatus may know the key (for example, all or a number of the instances of data units 200 may be provided with the same key, or one of a limited number of keys), or may be able to derive the key based on, for example, another portion of the message. By sending the encrypted message, the data unit 200 proves that it has access to the key, and, as long as it can be trusted that the key has been distributed in a secure manner, this authenticates the identity of the data unit 200. In other examples, other authentication methods may be used.

The authentication response may comprise, or provide a component of, a release code for the additive manufacturing build material processing apparatus, the release code being to authorize at least one additive manufacturing process of the additive manufacturing build material processing apparatus. For example, the release code may comprise a 'right to print' authorization, which allows an additive manufacturing apparatus to print an object (in some cases conditional on attributes of the object, such as the volume or material property specifications being reproducible in the build material associated with the data unit 200, or on an additive manufacturing apparatus being suitable to process the build material, or there being sufficient or appropriate build material available for a particular additive manufacturing task, or the like).

In some examples, at least some portions of the memory 204 are writable. In such examples, the communications interface 206 may be arranged to receive data and to write the data to the memory 204. For example, this may be data relating to at least one additive manufacturing parameter. In some examples, the memory 204 may comprise data fields and at least some data fields of the memory 204 may be associated with a condition. In such examples, the data to be written to the memory 204 may be associated with a validity check. For example, it may be case that a certain data field relates to the volume of build material in a container, and the container is not to be refilled. In such an example, it may be that field may be decremented, i.e. the value therein may reduce, but not increase. In such an example, a processing module (for example, of the data unit 200) may verify that the data meets the criteria before allowing the data field to be overwritten. In some examples, certain data fields may be written to 'read-only' data fields. This can be a function of the memory 204 itself (i.e. there may be no way of rewriting the memory 204) or may be controlled by a processing module. Other data fields may be rewritten once, or until a data field is locked (for example, to identify the build material processing apparatus which uses the build material associated therewith), and thereafter become read-only data fields. Other data fields may be associated with a token, for example comprising one or more bits which may be flipped from a 0 to a 1 or vice versa. In some examples, the token may be changed once only. Other data fields may be read and written to on several occasions. In some examples, the authentication module 208 may verify at least one of the additive manufacturing build material processing apparatus and the data content prior to writing the data to the memory.

In some examples, the memory 204 may be written with data to the effect that the data unit 200 will not authorise a subsequent read operation and/or build operation. For example, data may be written to the effect that the build material is exhausted, for example, a field relating to the volume of the build material may be set to zero, or empty. In another example, a key used for authentication may be overwritten or deleted such that the build material can no longer be authenticated. In another example, the memory may be cleared or overwritten (for example scrambled), or a flag may be set indicating that the data has been accessed.

Such measures may mean that the data unit 200 is prevented from providing a subsequent authorisation to print. This may for example be useful in preventing an attempt to circumvent the security provided by the data unit 200 by reusing the data unit 200 with build material from multiple containers. Unless a preventative measure is taken, this could result in false authorisation of build material. However, by taking action to prevent reuse of the data unit 200, the risks of such circumvention are reduced.

In some examples, at least a portion of the memory 204 could be written or rewritten with parameters 'on the fly', i.e. parameters may be generated for substantially immediate transmission to additive manufacturing build material processing apparatus. For example, a volume of build material may be determined based on a measurement of a volume or weight of build material in the container made in response to a request for parameters, passed to memory (for example on a transient basis) and transmitted to an additive manufacturing build material processing apparatus. In such examples, the memory 204 may comprise, at least in part, a transient memory, an 'overlay' memory, a data cache and/or a memory buffer, or the like, in which parameters are stored on a short term basis. However, such parameters may also be generated following a request and stored in a persistent manner, or until over-written.

In some examples, authentication may be two-way, i.e., the authentication module 208 may authenticate the additive manufacturing build material processing apparatus, for example based on the request received therefrom. It may be, for example, that data from the memory 204 is not transmitted to an additive manufacturing build material processing apparatus unless the request is authenticated. In some examples, it may be that an authentication response is not transmitted unless the request is authenticated, for example by use of a shared secret and/or a digital signature or the like.

The data security module 210 may decrypt encrypted data before transmission to an additive manufacturing build material processing apparatus. In some examples, the data may be (re)encrypted by the data security module 210 prior to transmission, for example based on a session key established following authentication, or using a public key of the build material processing apparatus.

The data unit mounting 101' of FIG. 2 comprises a first planar portion 212 and a second planar portion 214, the planar portions 212, 214 being substantially orthogonal. In this example, the planar portions 212, 214 are connected along a shared edge. The circuitry region 102 and the registration portion 104 are on the first planar portion 212, and the retaining feature 106 is provided on the second planar portion 214. By providing the circuitry region 102 and the retaining feature 106 on different planar portions 212, 214, the circuitry region 102 may to some extent be protected from pressure applied to deform the retaining feature 106.

It may be noted that, in this example, the retaining feature 106 has a first cross sectional thickness and the planar portions 212, 214 have a second, greater thickness. This may enhance the chances that the retaining feature 106 will flex, deform or break before the planar portions 212, 214. In some examples, there may be other features other than or as well as cross sectional thickness which serve to stiffen and/or strengthen at least one of the planar portions 212, 214 relative to the retaining feature 106. For example, such features may comprise strengthening ribs, or the planar portions 212, 214 be formed of a different material, or the like.

The second planar portion 214 also comprises a compressible element 216, in this example comprising a pair of extending arms 218a, 218b which extend at an angle to the body of the second planar portion 214. The arms 218a, 218b can be flexed back towards the body of the second planar portion 214. The maximal longitudinal length of the second planar portion 214 is defined by the positions of the arms 218a, 218b. When the arms are flexed towards the body of the second planar portion 214, the compressible element 216 is compressed and this reduces the longitudinal dimension of the second planar portion 214. In other examples, this dimension could be reduced in some other way, for example by providing a telescoping portion, a concertina portion, a sprung portion, a deformable portion, or the like and therefore the arms 218a, 218b are just one example of a compressible element 216.

The second planar portion 214 also comprises a handling portion 220, in this example a tab which extends from a central region of the second planar portion 214. In this example, the handling portion 220 extends substantially orthogonally from the second planar portion, in a plane which is substantially parallel to the plane of the first planar portion 212. As further set out below, and as illustrated in subsequent Figures, this means that the handling portion 220 may remain accessible when the data unit 200 is inserted into a build material container, and may be acted upon to remove the data unit 200 from build material container. The presence of the handling portion 220 may also prevent excessive handling of the circuitry (the memory 204, communications interface 206 and the like), which may be relatively delicate.

In addition, the second planar portion 214 may provide a 'stop' surface when the first planar portion 212 is inserted into a reader (for example, a slot reader of an additive manufacturing apparatus) or other apparatus such as a build material container, and may ensure that the data unit 200 at least partially remains outside such a reader. The handling portion 220 may facilitate removal therefrom. In the example of FIG. 2, a lip is provided at the common edge which protrudes in the plane of the second planar portion 214. This lip may provide stability either side of the first planar portion 212 when fully inserted in such apparatus to prevent rocking of the second planar portion about the common edge. It will be appreciated that such a stop surface could be provided in other ways, for example with a relatively smaller second planar portion 214, or by providing the first planar portion 212 in a central region of the second planar portion 214, or providing a protrusion on at least one side of the first planar portion, or the like.

The data unit 200 may for example comprise a 'smart card'. In one example, the first planar portion 212 has dimensions corresponding to the dimensions of a Universal Integrated Circuit Card (UICC), also termed a subscriber identity module, or SIM card. For example, the second planar portion 214 may have the dimensions of a SIM, MicroSIM or NanoSIM card. This allows the data unit 200 to be used with standard card reading apparatus. For example, in the Figures, the first planar portion 212 comprises a cut-off corner, which is an orientation feature as may be seen in a SIM card.

Figure 3:
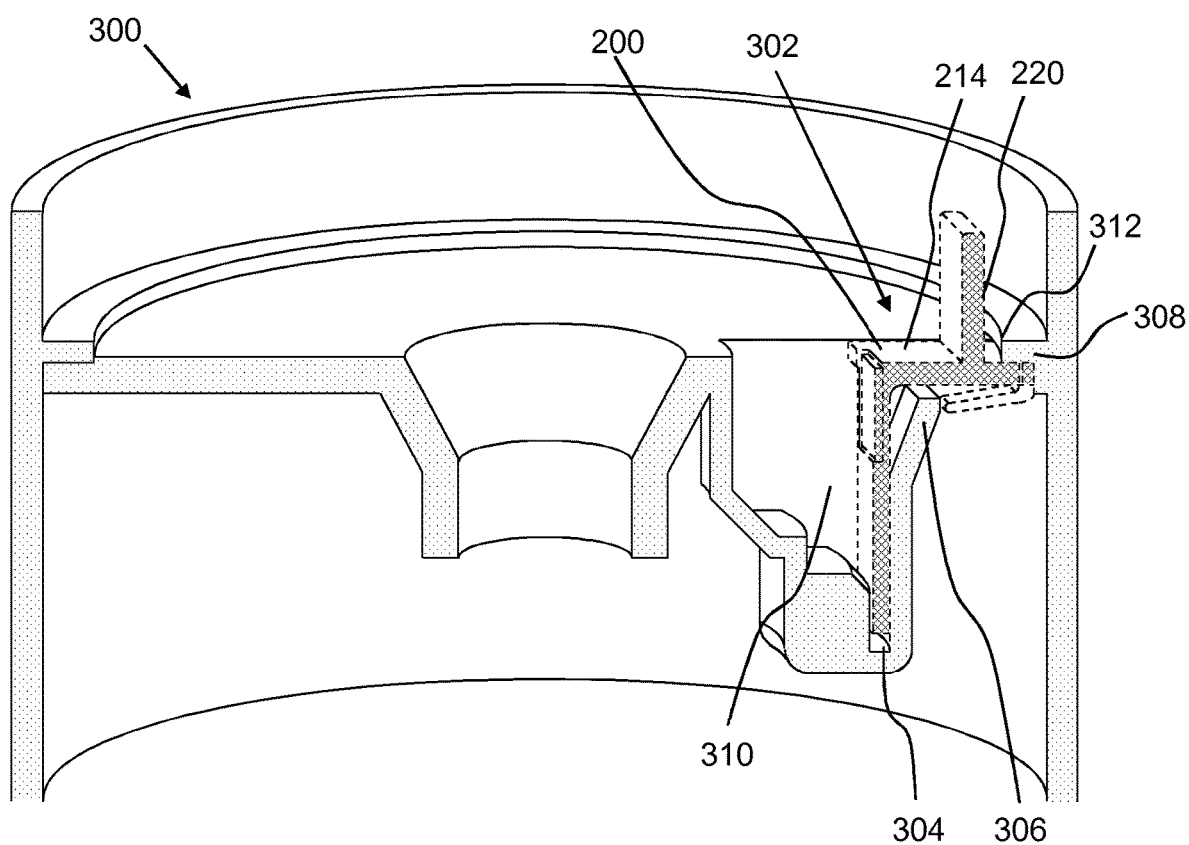
FIG. 3 shows a cross section of an example of a build material container outlet structure.

FIG. 3 shows a cut-through cross section of an example of a build material container outlet structure 300 comprising a receiving portion 302 for a data unit 200. The receiving portion 302 comprises a guide portion 304 to receive a registration portion of the data unit, in this example a slot which is slightly wider than an anticipated width of the data unit 200. However, other guide portions could be provided, and any feature or component of the receiving portion which acts to receive or locate any part of a data unit could function as a guide portion in which a corresponding registration portion of a data unit (which again may vary in form) is received. The receiving portion 302 also comprises at least one securing feature to retain the data unit, in this example comprising a tongue 306 and a flange 308, and a reader receiving region 310 to receive a memory reader, the memory reader being to read a data unit.

In this example, the flange 308 is a lip which extends at least partially around the circumference of the circular opening of the outlet structure 300. The lip has an arc-like interior surface 312 which may act as a deformation surface against which a data unit is to be urged, resulting in deformation thereof. For example, the arms 218a, 218b may be urged against this surface 312, resulting in a reduction in the length of the second planar portion 214 of the example data unit 200 of FIG. 2. This in turn may allow the retaining feature 106 to pass behind the tongue 306 (in some examples, flexing to do so). When the data unit 200 is then pushed to below the flange 308, the arms may re-extend, urging the retaining feature 106 to interlock with the tongue 306. In this way, the data unit 200 may be fitted to a build material container, and may be manufactured separately therefrom. For example, a data unit 200 may be added to a container at the point of shipping the container, and after manufacturing and filling processes carried out in relation to the container, which may risk damage to a data unit (which in some examples, may be relatively fragile, and/or comprise surface mounted circuitry which may be subject to damage by scratching or the like). In some examples, the data unit mounting 101' is arranged to be mounted on the container without the use of tools (i.e. it is adapted for tool-less insertion or mounting), such that the process is straightforward. In the event that, for example, a data unit 200 is damaged in transit, a user may then be able to replace the data unit 200 without specialised equipment or undue burden.

At least part of the build material container outlet structure 300 may comprise a conductive material, for example a conductive plastic material. As noted above, static electricity may build up, for example in a powder-like build material, and providing a conductive coupling may assist in controlling the extent of the build-up and the risk of sparks and the like.

Figure 4:
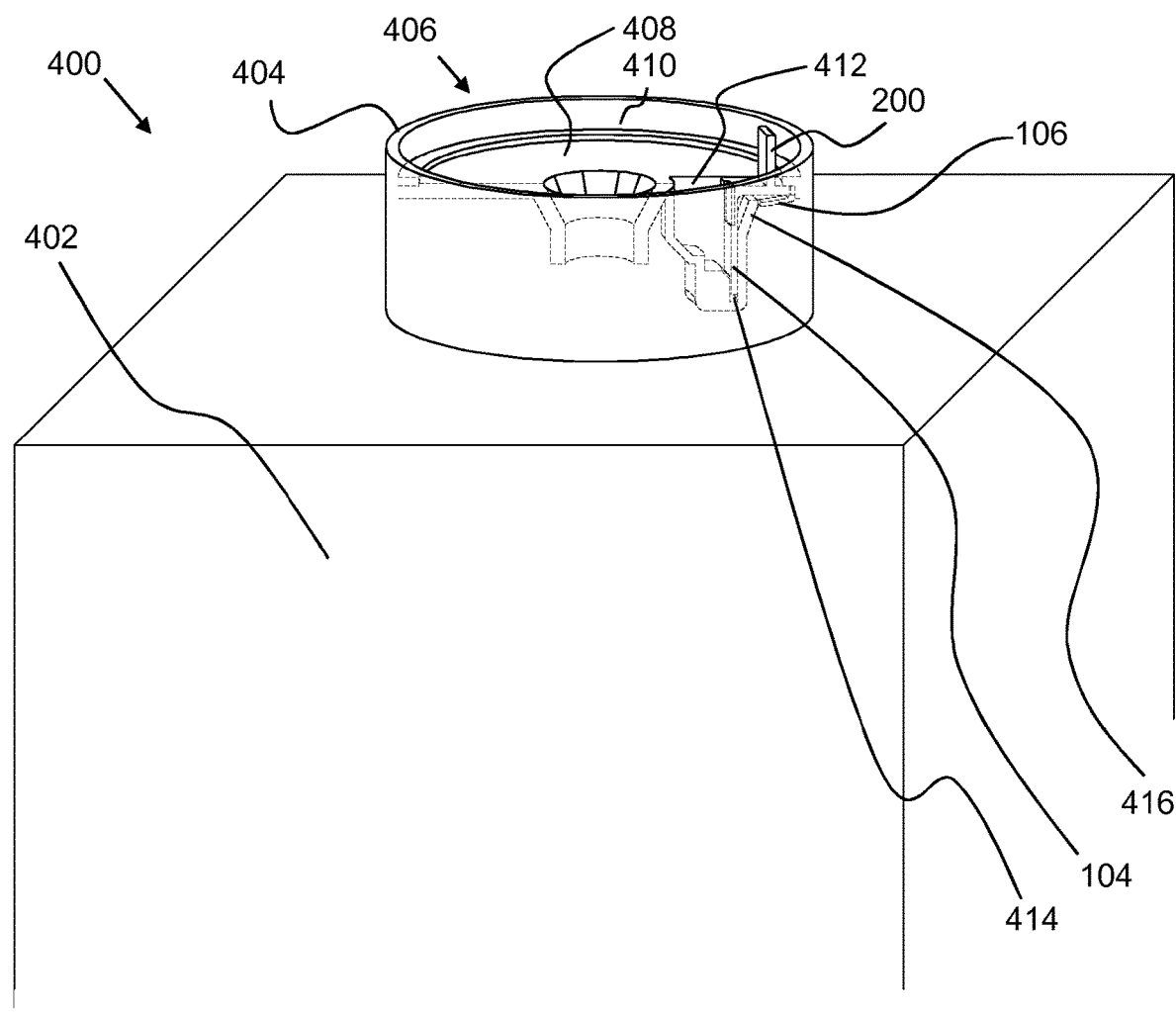
FIG. 4 shows part of an example of a build material container.

FIG. 4 shows part of a build material container 400 comprising a data unit 200 as described in relation to FIG. 2, a reservoir 402 for storing build material; and a build material container outlet structure 404. In this example, the data unit 200 is situated in the region of an opening in the container 400, which is provided with the outlet structure, in particular in a neck thereof. The build material container outlet structure 404 comprises an adaptor 406 to receive an aspiration tube in connection with the outlet structure 404, the adaptor 406 comprising an interface face 408 around its outlet opening, the interface face 408 extending perpendicular to an aspiration direction, and a standing circumferential wall 410 within which the aspiration tube is to be inserted to engage the interface face 408.

The build material container outlet structure 404 further comprises a reader receiving region 412 to receive a memory reader, the memory reader being configured on the aspiration tube and being to read the data unit 200. The data unit 200 is arranged in a receiving portion of the outlet structure 404, the registration portion 104 of the data unit 200 being in a guide portion 414 of the outlet structure 404, and the plastically deformable retaining feature 106 being retained by at least one securing feature of the outlet structure 404 (in this example a tongue 416) such that removal of the data unit 200 causes deformation thereof.

The reader receiving region 412 may provide an orientation feature to align the reader of the aspiration tube with the reader receiving region. In other examples, other or additional orientation features, such as ridges corresponding to grooves, or magnetic couplings, or the like, may be used to provide orientation features.

The reservoir 402 may hold build material. In some examples, the reservoir 402 may include an upper upright section having relatively upright side walls, at least in a filled state, along most of the height of the reservoir 402, a lower funnel having converging side walls; and the build material outlet structure 404 may provide the opening to allow build material to exit the reservoir 402.

The outlet structure 404 may comprise a retaining structure to maintain a connection to a connecting build material extraction element such as an aspiration tube which may be used to draw build material from the reservoir in to a build material processing apparatus.

In this example, the data unit 200 may be arranged in an opening such that when an extraction element is attached thereto, a reader apparatus in the extraction element may read the data unit 200. In some examples, the extraction element may be at least temporarily attached to the opening based on its orientation (e.g., there may be a locked or fixed orientation and unlocked orientation). In such examples, the locked orientation may be an orientation in which the reader is proximate to, or interlinked with, the data unit 200. However, in other examples, the data unit 200 may be read using a proximity reader and may for example be arranged on the exterior of the container 400, and/or may be read through the material of the container 400, or may be made available to a card slot by being arranged on an extending or rotating mounting, or may be read in some other way.

In FIG. 4, the registration portion 104 of the mounting 101' is received within a guide portion 414 which in this example is a slot which is slightly wider than an anticipated width of the data unit. This locates the data unit 200 in a predetermined position (for example, a position in which it can be read by a reader). The data unit 200 is held in place as described in relation to FIG. 3 above.

The outlet structure 404 may include a collect structure to collect build material from the bottom and guide the build material to an outlet opening at the top. For example, this may be a tube (which may be rigid tube) which extends to the lower portions of the reservoir 402. The reservoir 402 may comprise, or be lined with, a flexible material such that, when build material is removed therefrom (for example under a negative pressure), the volume of the reservoir may decrease. The reservoir may be contained in a rigid or semi rigid supporting structure which does not deform.

In one example the container 400 may contain a source supply of fresh build material. In another example the container is a source supply of recycled or partly recycled build material. In yet another example the container may be used, at least temporarily, as a buffer supply.

Figure 5:
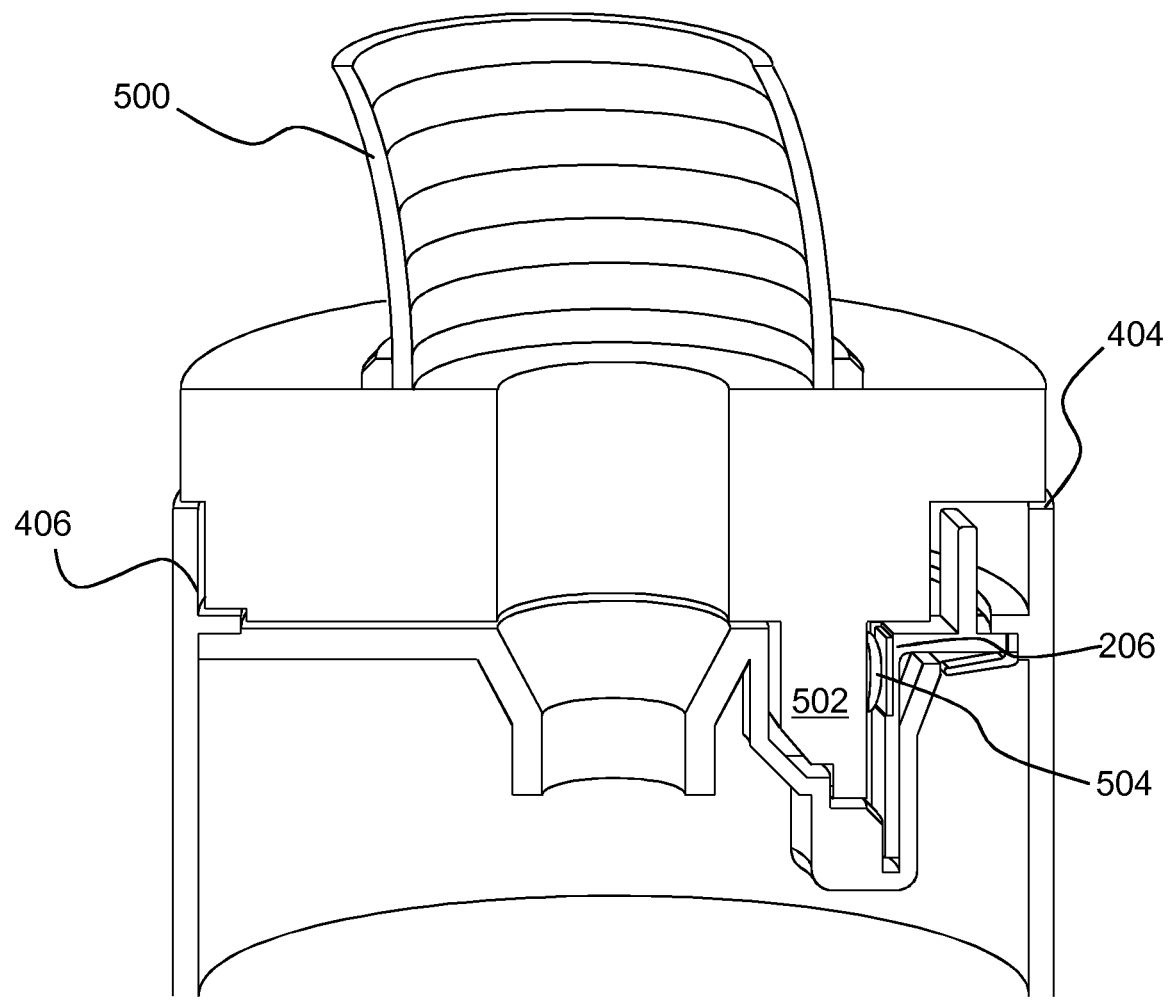
FIGS. 5 and 6 show an example of a build material container outlet structure containing a data unit in cross section.

FIG. 5 shows the example outlet structure 404 of FIG. 4 with an aspiration tube 500 and associated reader 502 in situ. The reader 502 in this example comprises a plurality of pin couplings 504, which may be sprung and which are urged against the communications interface 206 of the data unit 200 when the aspiration tube 500 is received within the adaptor 406.

The reader 502 may access the content of the data unit 200. For example, it may form a communication link via the pin couplings 504, carry out authentication of the build material and/or the data, and access the data for use by any apparatus used in object generation. In some examples, the reader 502 may also write data to the data unit 200.

In some examples, the aspiration tube 500 may provide the build material to a build material preparation or mixing apparatus, in which the build material may be mixed with build materials from other sources. In such examples, the data may be used to check that the materials will be compatible, and/or are suitable for processing by the apparatus (which may be based on the capabilities of the apparatus, or the state thereof, such as whether it has previously been used to process incompatible build materials and has not been cleaned such that potentially damaging or degrading trace amounts remained). The data may be used to provide authentication of the build material, or of associated data.

In some examples, the aspiration tube 500 may provide the build material to an additive manufacturing apparatus, in which at least one object may be generated therefrom. In such examples, the data may be used to check that the build materials are suitable for processing by the apparatus (which may be based on the capabilities of the apparatus, the object to be generated, or the state thereof, such as whether it has previously been used to process incompatible build materials and has not been cleaned such that potentially damaging or degrading trace amounts remained). The data may be used to determine processing parameters, for example processing temperatures or the like. In some examples, the apparatus may write data onto the data unit 200, for example specifying how much of the material has been used.

Figure 6:
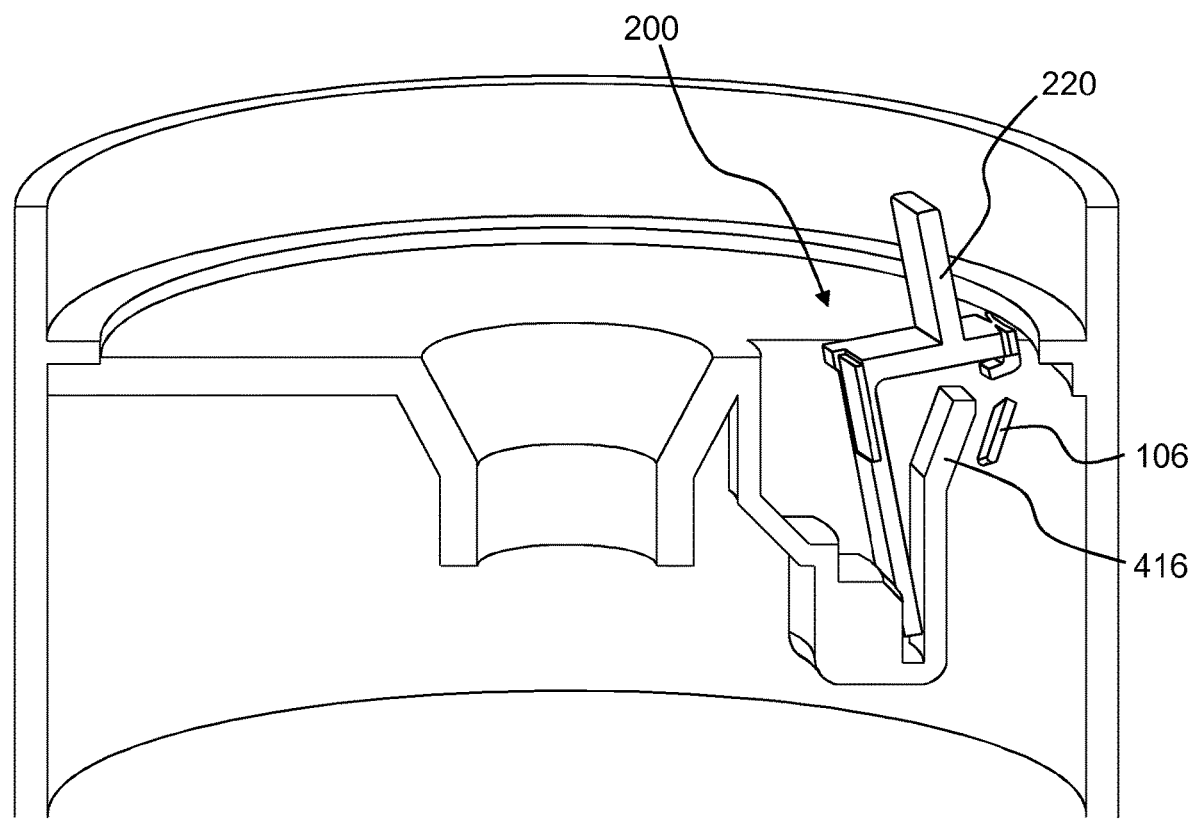

In the absence of an aspiration tube 500, and as shown in FIG. 6, the data unit 200 may be urged into the reader receiving region 412. The upper face of the retaining feature 106 will act on the tongue 416. The tongue 416 in this example is more rigid that the retaining feature 106 and the retaining feature 106 will be caused to bend until it breaks, at which point the remaining structure of the data unit 200 may be removed from the build material container 400. In other words, in this example, the tongue 416 provides a securing feature which retains the data unit 200 such that the data unit 200 is retained unless deformed. In other examples, material in the region of the compressible element 216 may also bend or break (for example, at the narrowed portion defined at the base of the arms 218), so as to release the data unit 200 from the outlet structure 404.

In this example, removal of the data unit 200 may be effected by manual pressing on the handling portion 220. In general, the data unit 200 may be configured for tool-less removal from a build material container 400.

In such examples, the data unit 200 may be supplied to an alternative reader, for example a card reader slot on an apparatus, which may be a build material preparation apparatus, a mixing apparatus or an additive manufacturing apparatus or the like. Again, the data thereon may be used to check that the materials are suitable for processing by the apparatus (which may be based on the capabilities of the apparatus, the object to be generated, or the state thereof, such as whether it has previously been used to process incompatible build materials and has not been cleaned such that potentially damaging or degrading trace amounts remained). In some examples, the apparatus may write data onto the data unit 200, for example specifying how much of the material has been used. In some examples, for example where removal of the material is not metered or controlled (as it may be for example when using an aspiration tube), in order to enhance security, the apparatus may write data onto the data unit 200 indicating that all of the build material has been used. In some examples, the reading apparatus may write an indication that the data thereon has been read to the data unit 200. For example, this may set a volume of build material remaining to be none, or may set a flag or revoke a key. This may result in the ability of the data source to authenticate or allow object generation processes to carried out in a manner authorised thereby being revoked.

As briefly noted above, the data may include at least one additive manufacturing parameter from the available data source, such that an apparatus can process the build material according thereto. For example, a parameter may specify at least one processing parameter such as a processing temperature. For examples in which compatibility parameters are included in the build material parameters, the apparatus may be provided with data to determine if the build material is compatible with the apparatus, or with build material previously used in the apparatus (for example, build materials used since a cleaning operation), to determining processing settings, and/or for validation. In some examples, processing the build material by the additive manufacturing apparatus may comprise rejecting the build material, for example on the basis that it is incompatible or non-authorised, or permitting ingress of the build material following a cleaning operation.

It may be noted that, in the example of FIG. 6, once removed from the build material container 400, the data unit 200 is permanently altered, in this example by the retaining feature 106 being broken away (i.e. the retaining feature is a breakable feature). This may be apparent from a physical inspection thereof. Therefore, if the data unit 200 is removed from a build material container 400, this is apparent and provides a 'tamper evident' structure.

By providing the possibility of authorising an additive manufacturing apparatus to manufacture an object and/or providing data for use in processing the build material via a plurality of routes, this increases the flexibility of the system without unduly diminishing security.

Some aspects in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus (such as the communications interface 206, authentication module 208 and data security module 210) may be implemented by at least one processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Machine readable instructions may also be loaded onto a computer or other programmable data processing devices, so that the computer or other programmable data processing devices perform a series of operations to produce computer-implemented processing.

Further, some aspects herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

What is claimed is:
1. A build material container outlet structure comprising:
an adaptor structured to interface with an aspiration tube of an additive manufacturing apparatus, the adaptor disposed around an outlet opening of the outlet structure for accessing an interior of a build material container; and
a receiving portion for a data unit, the receiving portion comprising:

a guide portion to receive a registration portion of the data unit;

a securing feature to retain the data unit; and a reader receiving region to receive a reader, the reader being to read a data source of the data unit.

2. The build material container outlet structure according to claim 1 in which the securing feature comprises at least one of a flange and a tongue.

3. The build material container outlet structure according to claim 1 comprising a deformation surface against which a data unit may be urged, resulting in deformation thereof.

4. The build material container outlet structure according to claim 1 in which the securing feature is to retain the data unit such that the data unit is retained unless deformed.

5. The build material container outlet structure according to claim 1 which comprises a conductive plastic material.

6. The build material container outlet structure according to claim 1, wherein the receiving portion of the outlet structure is arranged such that removal of the data unit causes permanent deformation thereof.

7. The build material container outlet structure of claim 1, wherein the data unit comprises, in a monolithic component, a first planar portion and a second planar portion, the planar portions being substantially orthogonal, wherein a circuitry region to receive circuitry and the registration portion are provided on the first planar portion and a retaining feature and a compressible element for engaging the securing feature are provided on the second planar portion, the data unit being for tool-less insertion into the receiving portion, the compressible element is compressible to reduce a dimension of the second planar portion, and the retaining feature is more readily deformable than the first and second planar portions.

8. The build material container outlet structure of claim 1, the data unit comprising:

a data unit mounting comprising a first planar portion and a second planar portion, the first planar portion and the second planar portion being substantially orthogonal, wherein circuitry is arranged on the first planar portion and the second planar portion is to provide a stop surface such that, when the first planar portion is inserted into a slot reader of an additive manufacturing component, the second planar portion limits the depth of insertion, and in which the circuitry comprises at least one of:

a data source to provide at least one additive manufacturing parameter;

a communications interface to communicate with a reader of an additive manufacturing build material processing apparatus;

an authentication module to provide an authentication response to an authentication request; and a data security module to decrypt data.

9. The build material container outlet structure of claim 1, further comprising an opening into an interior of a build material container for removing build material from the build material container, the receiving portion being adjacent to the opening.

10. The build material container outlet structure of claim 1, with the data unit releasably engaged in the receiving portion, the data unit comprising circuitry mounted on a circuitry region, the circuitry storing data.

11. The build material container outlet structure of claim 10, wherein the reader receiving region is adjacent to the circuitry on the data unit to permit a reader access to the circuitry on the data unit for reading the stored data.

12. The build material container outlet structure of claim 10, the data unit further comprising a handling portion extending away from the guide portion that receives the registration portion of the data unit.

13. The build material container outlet structure of claim 10, the data unit further comprising a compressible element that is compressed when the data unit is engaged in the receiving portion.

14. The build material container outlet structure of claim 13, wherein the compressible element comprises two flexible arms.

15. The build material container outlet structure of claim 1, wherein the data unit comprises a first planar portion and a second planar portion, the first planar portion and the second planar portion being substantially orthogonal, wherein a circuitry region and the registration portion are on the first planar portion.

16. The build material container outlet structure of claim 15, wherein a retaining feature to cooperate with the securing feature is disposed on the second planar portion.

17. The build material container outlet structure of claim 1, wherein the data unit comprises a circuitry region that is recessed within a face of the data unit.

18. A build material container outlet structure comprising a receiving portion for a data unit, the receiving portion comprising:

a guide portion to receive a registration portion of the data unit;

a securing feature to retain the data unit; and a reader receiving region to receive a reader, the reader being to read a data source of the data unit;

with the data unit releasably engaged in the receiving portion, the data unit comprising circuitry mounted on a circuitry region, the circuitry storing data; and the data unit further comprising a deformable retaining feature to engage the securing feature of the receiving portion.

19. The build material container outlet structure of claim 18, wherein a deformation of the retaining feature to effect removal of the data unit from the receiving portion is a permanent deformation.

20. The build material container outlet structure of claim 19, the data unit comprising a retaining feature to cooperate with the securing feature of the receiving portion, the retaining feature being a breakable feature.

21. A build material container outlet structure comprising a receiving portion for a data unit, the receiving portion comprising:

a guide portion to receive a registration portion of the data unit;

a securing feature to retain the data unit; and a reader receiving region to receive a reader, the reader being to read a data source of the data unit;

wherein the data unit comprises a first planar portion and a second planar portion, the first planar portion and the second planar portion being substantially orthogonal, wherein a circuitry region and the registration portion are on the first planar portion; and the second planar portion comprises at least one compressible element, wherein compression of the compressible element reduces a dimension of the second planar portion.

* * * * *